United States Patent [19]

Raichlen et al.

[11] Patent Number: 4,698,969
[45] Date of Patent: Oct. 13, 1987

[54] WAVE POWER CONVERTER

[75] Inventors: Fredric Raichlen, San Marino; Jiin-Jen Lee, Sierra Madre, both of Calif.

[73] Assignee: Wave Power Industries, Ltd., Arcadia, Calif.

[21] Appl. No.: 774,893

[22] Filed: Sep. 11, 1985

Related U.S. Application Data

[63] Continuation-in-part of Ser. No. 588,916, Mar. 12, 1984, Pat. No. 4,594,853.

[51] Int. Cl.⁴ .............................................. F03B 13/12
[52] U.S. Cl. ..................................... 60/502; 417/331; 60/398
[58] Field of Search ................. 60/497, 499, 502, 398; 290/53; 417/330, 331, 333

[56] References Cited

U.S. PATENT DOCUMENTS

| | | | |
|---|---|---|---|
| 138,474 | 5/1973 | Buckner . | |
| 430,790 | 6/1880 | Starkenberg . | |
| 526,082 | 9/1894 | Merritt . | |
| 599,756 | 3/1898 | Wright . | |
| 616,615 | 12/1898 | Hagen . | |
| 875,950 | 1/1908 | Reynolds . | |
| 984,131 | 2/1911 | Gammons . | |
| 1,294,808 | 2/1919 | Jenkins . | |
| 2,820,148 | 3/1957 | Southwick | 290/4 |
| 2,886,951 | 5/1959 | Valembois . | |
| 3,487,228 | 2/1969 | Kriegel | 290/53 |
| 3,515,889 | 6/1970 | Kammerer | 290/53 |
| 4,189,918 | 2/1980 | Moody | 290/53 |
| 4,260,901 | 4/1981 | Woodbridge | 417/331 X |
| 4,281,257 | 7/1981 | Testa et al. | 290/53 |
| 4,441,316 | 4/1984 | Moody | 60/497 X |
| 4,594,853 | 6/1986 | Raichlen et al. | 60/398 X |

FOREIGN PATENT DOCUMENTS

| | | |
|---|---|---|
| 39085 | 8/1886 | Fed. Rep. of Germany . |
| 2507373 | 8/1975 | Fed. Rep. of Germany . |
| 588271 | 7/1981 | Japan . |
| 145548 | 4/1979 | Norway . |
| 153542 | 12/1985 | Norway . |
| 7087 | of 1911 | United Kingdom . |
| 2058937 | 4/1981 | United Kingdom . |
| 1593983 | 7/1981 | United Kingdom . |
| 2071772 | 9/1981 | United Kingdom . |

OTHER PUBLICATIONS

F. Raichlen, "Harbor Resonance", Chpt. 7 of Estuary and Coastline Hydrodynamics, 1966, Ippen (editor), McGraw-Hill, 1966.

*Primary Examiner*—Allen M. Ostrager
*Attorney, Agent, or Firm*—Sheldon & Mak

[57] ABSTRACT

An apparatus for converting power from the wave motion of a body of water comprises a chamber with an opening for receiving waves. The chamber amplifies the amplitude of the waves. The wall of the chamber preferably has protuberance adjacent the opening for smoothing the flow of water through the opening. A float within the chamber is connected to a pump for converting the energy of the waves into useful energy.

16 Claims, 20 Drawing Figures

WAVE POWER CONVERTER

BACKGROUND

This application is a continuation-in-part of a copending application by the same inventors, application Ser. No. 588,916, filed Mar. 12, 1984, now U.S. Pat. No. 4,594,853, issued on June 17, 1986, which is incorporated herein by reference.

The present invention relates to the conversion of the wave motion of bodies of water such as the ocean to useful forms of energy.

For thousands of years, man has dreamed of harnessing the energy of the oceans. Attempts have been made to generate electricity from the ebb and flow of the tides. Attempts have also been made to generate electricity from the up and down motion of a float on the oceans. Such attempts are described in U.S. Pat. No. 3,487,228 to Kriegel and U.S. Pat. No. 3,515,889 to Kammerer.

There are significant problems associated with harnessing energy from the motion of a float. One problem is that the float is continuously exposed to the punishing wave action of the oceans, which can severely damage the float, particularly during storms.

Another problem is constructing hardware that can convert the vertical motion of a float to useful energy. Articulated joints and other fragile structures are often required. These structures, subject to the constant hammering of the ocean waves and a corrosive salt water environment, have a limited life.

Another problem is that testing for the effects of large amplitude wave activity on marine hardware is often delayed during periods of relative calm.

Another problem associated with power generating systems based upon a float moving up and down with ocean waves is down time associated with calm water. Waves of sufficient magnitude are required to achieve a level of efficiency warranting the capital investment required for a generating system. However, in many areas of the world the waves do not achieve the necessary amplitude during a substantial portion of the year, particularly during the summer. Thus, either the power generating system is not useful during these times of the year, or expensive reservoir systems must be constructed to provide energy continuously.

This invention is directed to solving these problems for fulfilling man's dream of harnessing the inexhaustible energy of the ocean waves.

SUMMARY

The present invention is directed to an apparatus that amplifies the wave motion of a large body of water. The apparatus comprises a chamber having a wall with an opening therethrough for passage of water and waves into and out of the chamber. The opening is in a vertical portion of the wall generally facing the direction of wave propagation. The chamber amplifies the wave motion of the body of water so that the amplitude of waves in the chamber is greater than the amplitude of the waves passing into the chamber through the opening. An important feature of the present invention is that preferably the wall of the chamber can be provided with protuberances at the edge of the opening for smoothing the flow of water through the opening. By smoothing the flow of water through the opening, at least some of the energy that would otherwise be lost in turbulence generated by flow separation is advantageously converted into increased amplification of the wave motion in the chamber. Preferably a float in the chamber moves up and down in response to the wave motion in the chamber for extracting useful energy from the wave motion. A pump is operatively connected to the float for converting the kinetic energy of the float to hydraulic power.

The features of wave amplification by the chamber and the protuberances smoothing the flow of water through the opening can be used singly or in combination for increasing the amplitude of waves in the chamber above the amplitude that would otherwise be present therein.

Preferably external and internal protuberances are attached respectively to outside and inside surfaces of the wall for smoothing the flow both entering and exiting the chambers.

Preferably the external protuberance has an equivalent diameter of from about 0.2 to about 0.8 times the equivalent diameter of the chamber. Preferably the internal protuberance has an equivalent diameter of from about 0.1 to about 0.4 times the equivalent diameter of the chamber.

The pump can be a piston pump directly connected to the float, the increased amplitude of the waves permitting a cost-efficient long-stroke pump to be used without requiring a complex mechanism having articulated joints or other fragile structures.

In one version of the present invention the pump is connected to a generator for producing electric power.

In another version of the present invention the pump is connected to a water supply system for pumping water under pressure. The water supply system can include a system for removing salt from a supply of brackish water such as by reverse osmosis.

So that the chamber is resonant and operates in the fundamental mode, preferably it is sized so that its equivalent diameter is from about 0.15 L/pi to about L/pi, where L is the length between the crest of the waves entering the chamber through the opening and pi=3.14159. Generally the equivalent diameter of the chamber is less than 100 feet. For a chamber that is circular in horizontal cross-section, preferably its diameter is from about 0.2 L/pi to about 0.6 L/pi Such a chamber can have a diameter of from about 40 to about 70 feet.

Preferably the opening is parallel to the crest of the waves entering the chamber and comprises from about 1/36 to about ⅓ of the perimeter of the chamber and preferably comprises at least 1/18 of the perimeter of the chamber.

In one version of the invention, a portion of the wall of the chamber can be provided by a breakwater structure, and a plurality of such chambers having a float therein can be associated with a single breakwater.

With an amplification chamber having smoothing appurtenances at its opening, the amplitude of the waves in the chamber can exceed two to three times the amplitude of the incoming waves. It is apparent that the present invention substantially increases the efficiency of any wave powered apparatus utilizing the ocean waves to raise and lower a float. Equally important, the walls of the chamber protect the float and associated equipment from the action of the oceans, thereby prolonging the life of the apparatus and allowing the use of relatively fragile, highly efficient equipment that could not be used in the absence of the chamber. For example, the float can be a "pancake" shaped float that is cylindrical having a diameter at least 4 times greater than the thickness of the float. This "pancake" float is more fragile than a spherical float, but is substantially less expensive. With the wall of the chamber protecting the pancake float, it can successfully be used.

DRAWINGS

These and other features, aspects, and advantages of the present invention will become better understood with reference to the following description, appended claims, and accompanying drawings where:

DESCRIPTION

Figure 1:
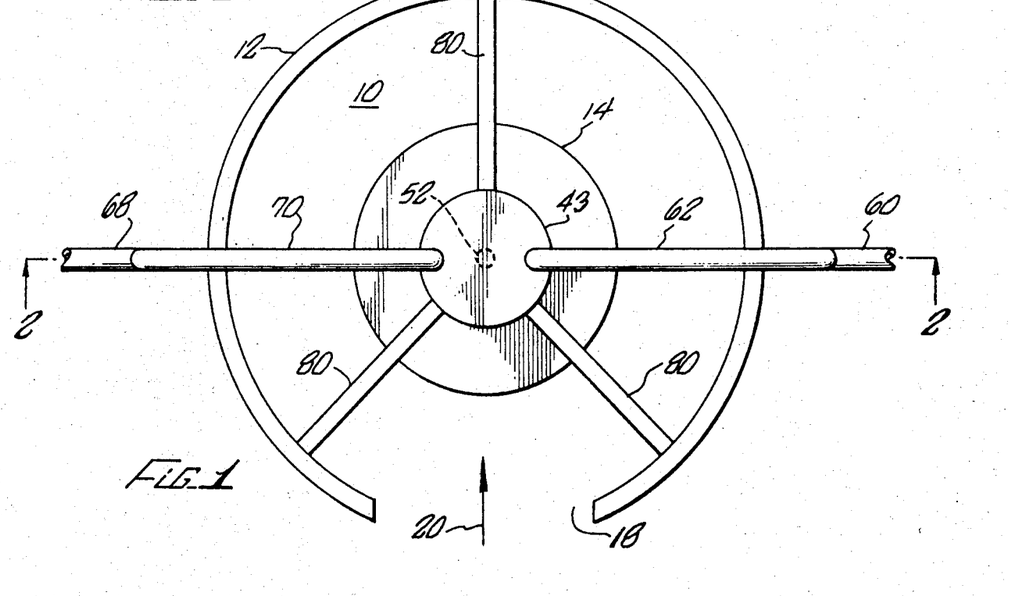
FIG. 1 is a top plan view of an apparatus for generating power from movement of ocean waves constructed in accordance with the principles of the present invention.
Figure 2:
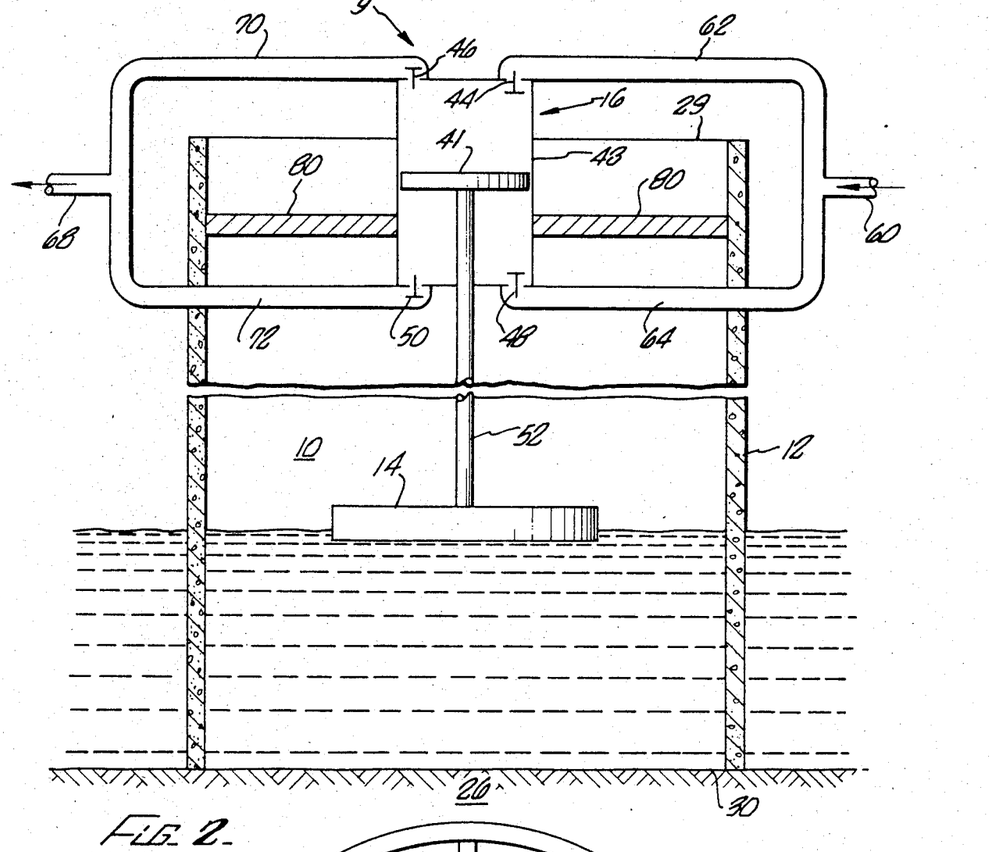
FIG. 2 is a partial sectional view of the apparatus of FIG. 1 taken on line 2—2 in FIG. 1.

With reference to FIGS. 1 and 2, an apparatus 9 for converting the wave motion of the oceans into useful energy comprises as its principle elements a chamber 10 provided with an enclosing wall 12, a float 14, and a piston pump 16. The wall 12 has a slot or opening 18 therein positioned to receive incoming ocean waves as indicated by arrow 20 in FIG. 1. A plane 22 represents an average elevation of the water neglecting wave activity.

The apparatus 9 is particularly adapted for use with the ocean waves. However, it can be used in any body of water that has sufficient wave energy to make the installation of the apparatus 9 economical.

The chamber 10 is sized, located, and configured to be a resonant chamber operating in the fundamental mode. By the term "resonant chamber" there is meant a chamber where the amplitude of the waves in the chamber is greater than the amplitude of waves passing into the chamber. By the term "fundamental mode, there is meant the first or principal resonant mode that occurs with an oscillating system.

It is important that the chamber operate in the fundamental mode for many reasons. First, the fundamental mode produces more amplification of the waves than other modes.

Second, a chamber operating in the fundamental mode can be smaller than one operating in a different mode. For example, a chamber operating in the next higher mode, for the same wave conditions, would need to be about 3 times larger in diameter than a chamber operating in the fundamental.

Third, a chamber operating in the fundamental mode is less susceptible to changes in wave conditions and can provide amplification over a wider range of wave conditions than a chamber operating in a higher mode. For example, a chamber operating in the fundamental mode can accommodate changes in the wave length L of about ±30% from the design value and still amplify the incoming waves. However, a chamber operating in the next higher mode and designed for the same L can accommodate deviations of only about ±15% without dampening the incoming waves. Fourth, the wave amplitude in the chamber is more uniform in the fundamental mode. With a higner mode, both peaks and troughs can be in the chamber at the same time. While in the fundamental mode, the height of the water in the chamber at any given time is generally uniform, i.e. at any one time the elevation everywhere in the chamber is above, equal to, or below the still water level.

The chamber 10 traps the energy of ocean waves and converts the orbital motion of a wave into a heave motion for moving the float 14 up and down in the chamber. The chamber is sized so that equivalent diameter of the chamber is from 0.15 L/pi to L/pi, where L is the length between the crest of waves entering the chamber through the opening 18. The equivalent diameter, D, of a chamber is determined by the formula:

$$D = (4A/pi)^{\frac{1}{2}}$$

where A is the horizontal cross-sectional surface area of the chamber. When dimensions of the chamber and float are specified herein, reference is being made to that dimension at the water line. For example, for a chamber whose horizontal cross-sectional area varies along the height of the chamber, A and D are determined at the water line.

L is dependent upon the depth of the water in which the chamber is located, as well as the period of the incoming waves. L can be determined from the following formula:

$$(2\pi/T)^2 = (2g\pi/L)\tanh(2\pi h/L)$$

where
T = the period of the waves;
h = the mean depth of the water in which the apparatus 9 is located; and
g = gravitational constant.
pi = 3.14159

The chamber needs to be constructed to accommodate different wave conditions. By investigating the wave conditions at a particular site, ranges for the wave length at the site can be determined and thus the equivalent diameter of the chamber can be chosen.

Generally, as the depth of the water in which the apparatus 9 is located increases, the diameter of the chamber increases. Likewise, as the period of the waves increases, the diameter of the chamber increases. Typically, the period for waves is from about 5 to 20 seconds and the chamber is sited in a location where the water depth is from about 25 to about 60 feet. It is desirable that the depth of the water in the chamber be constant. Therefore, preferably the entire chamber is at least 50 feet from shore.

The equivalent diameter of the chamber is less than about 20 to 100 feet, preferably greater than 20 feet, and more preferably from about 40 to about 70 feet to obtain high amplification in the fundamental mode under a great variety of wave conditions.

For a cylindrical chamber, preferably the diameter of the chamber is from about 0.2 L/pi to about 0.6 L/pi.

Figure 4:
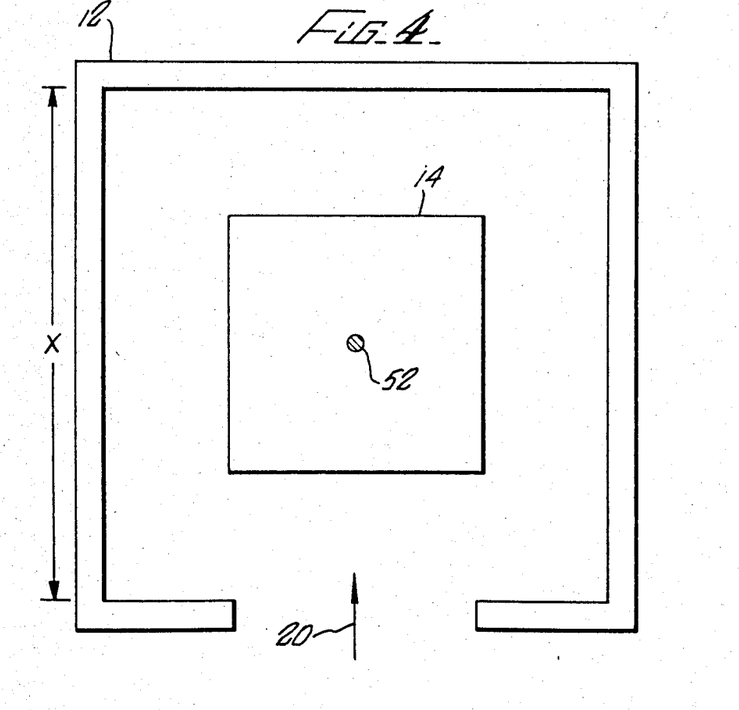
FIG. 4 is a top plan view of another apparatus according to the present invention, having a square chamber.

For a chamber rectangular in horizontal cross-section, preferably the distance from the opening to the far wall opposite the opening is from about 0.15 L/pi to about 0.7 L/pi. This distance is shown as dimension X in FIG. 4.

The chamber can be of any shape, including circular, rectangular (including square), elliptical, or polygon. Preferaby the chamber is sufficiently tall that it is higner than the maximum amplitude of the waves in the chamber. The walls 12 of the chamber 10 can be formed of any suitable material such as steel or reinforced concrete.

Figure 5:
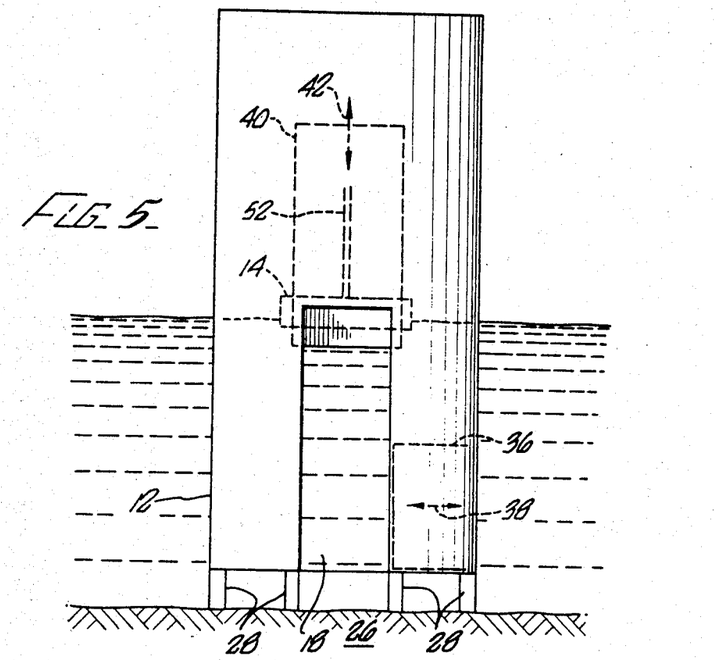
FIG. 5 is a front elevation view of another apparatus according to the present invention provided with means for varying the size of the opening in the wall of the chamber.

As shown in FIG. 2, preferably the chamber is positioned with its walls directly on the sea bed 26. The absence of a solid floor can adversely affect amplification. Alternatively, as shown in FIG. 5, the chamber can be built on piles 28 above the sea bed 26 to help prevent sand from drifting into the chamber through the opening 18. The chamber can have a man-made top wall and bottom wall, but preferably for economic reasons, has neither.

The opening 18 generally is a vertical slot that extends along the entire height of the chamber wall 12. If desired, the opening 18 can extend down from the top 24 of the chamber 10 only part way toward the bottom 30 of the chamber. Similarly, the slot can extend only partway up from the bottom 30 of the chamber toward the top 24. If desired, the top of the slot can be below the mean water line. One advantage of a slot that extends only partway up the wall 12 of the chamber is that it protects the float and pump 16 from very large waves. Another and important advantage is that the top surface of the water in the chamber is less irregular. This is because the water surface motions take place in a closed cylinder. It is expected that the more uniform water surface inside the chamber enhances the response of the float.

Figure 3:
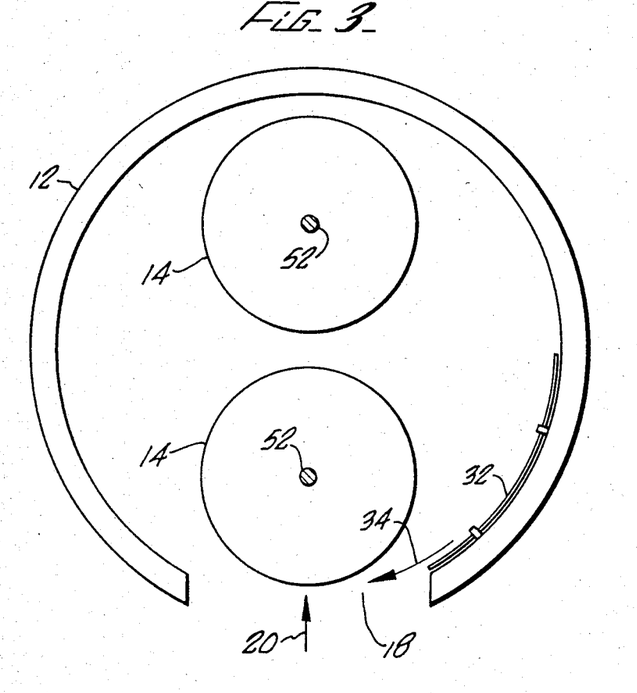
FIG. 3 is a top plan view of another apparatus according to the present invention having two floats in a chamber.

As shown in FIGS. 3 and 5, the slot can be provided with means for varying its size. In the version shown in FIG. 3, a movable door 32 is mounted inside the chamber and positioned so that it can be slid across the opening 18 as shown by arrow 34. In times of storms, or when the equipment inside the chamber requires repair, the opening 18 can be partially or entirely closed with the door 32.

In the version shown in FIG. 5, a door 36 is provided for closing off the bottom portion of the opening 18 by sliding in the direction shown by arrow 38. Also, a second door 40 is provided tor sliding downwardly in the direction of arrow 42 for closing off at least the top portion of the opening 18, and if desired, the entire opening.

At the water line, the opening comprises from about 1/36 to about ⅓ of the perimeter of the chamber, and more preferably from about 1/18 to about 2/9 of the perimeter of the chamber. Thus, for a cylindrical chamber, the opening extends about 10 degrees to 120 degrees, and more preferably from about 20 degrees to about 80 degrees. Thus, the size of the opening 18 can be varied, and the location of the opening 18 with reference to the water level and wave motion can be varied, depending upon the tides and wave conditions.

There can be more than one opening into the chamber, and the opening can be of any shape that results in effective amplification of waves in the chamber. Preferably the opening is located so as to be facing incoming waves, with the opening generally parallel to the crest of the waves.

The float 14 can be of any desired configuration, including prismatic such as a cube, cylindrical, either an elongated cylinder or a short cylinder such as a round plinth or "pancake"; or ellipsoidal such as spherical. Because of the protection provided by the chamber or wall 12, the survivability of the float is assured. Therefore, in designing and configuring the float, emphasis can be placed upon maximizing energy output and reducing costs.

Preferably the float is a "pancake" or plinth, i.e. a short section of a cylinder, where the diameter is substantially greater than the height of the float, and generally at least four times greater, and preferably at least six times greater. Preferably the surface area of all of the floats at the water line is at least one half the surface area of the chamber.

The float preferably has neutral buoyancy, i.e. the float has a float density of about one half where one half of the volume of the float is above the water surface and about one half the volume of the float is below the water surface. This results in a force on the power generating equipment that is approximately equal on the up and down strokes of the float. Moreover, if the float were so light that the bulk of it were above the water, or if the float were so dense that the bulk of it were below the water, inadequate tracking of the wave motion could result. For maximum harnessing of the wave motion, it is important that the float closely track the waves.

The float 14 can be formed of a corrosion resistant material, such as stainless steel, monel, or reinforced fiberglass. It can be solid or it can be hollow. If it is hollow, it can contain air or other gas, or a liquid such as the ocean water itself or a solid such as sand or concrete.

As shown in FIG. 3, there can be more than one float 14 in a chamber 10.

The kinetic energy of the float 14 can be converted into useful energy utilizing a wide variety of previously known systems used to convert the motion of a float to other forms of energy such as electricity. Among systems that are useful are the hydraulic systems shown in U.S. Pat. Nos. 3,487,228 and 3,515,889 where a float is operatively connected to a piston pump, and the pump is connected to a hydraulic motor that drives an electrical generator. Other systems are shown in U.S. Pat. Nos. 138,474; 430,790; 599,756; 616,615; and 4,281,257.

Figure 8:
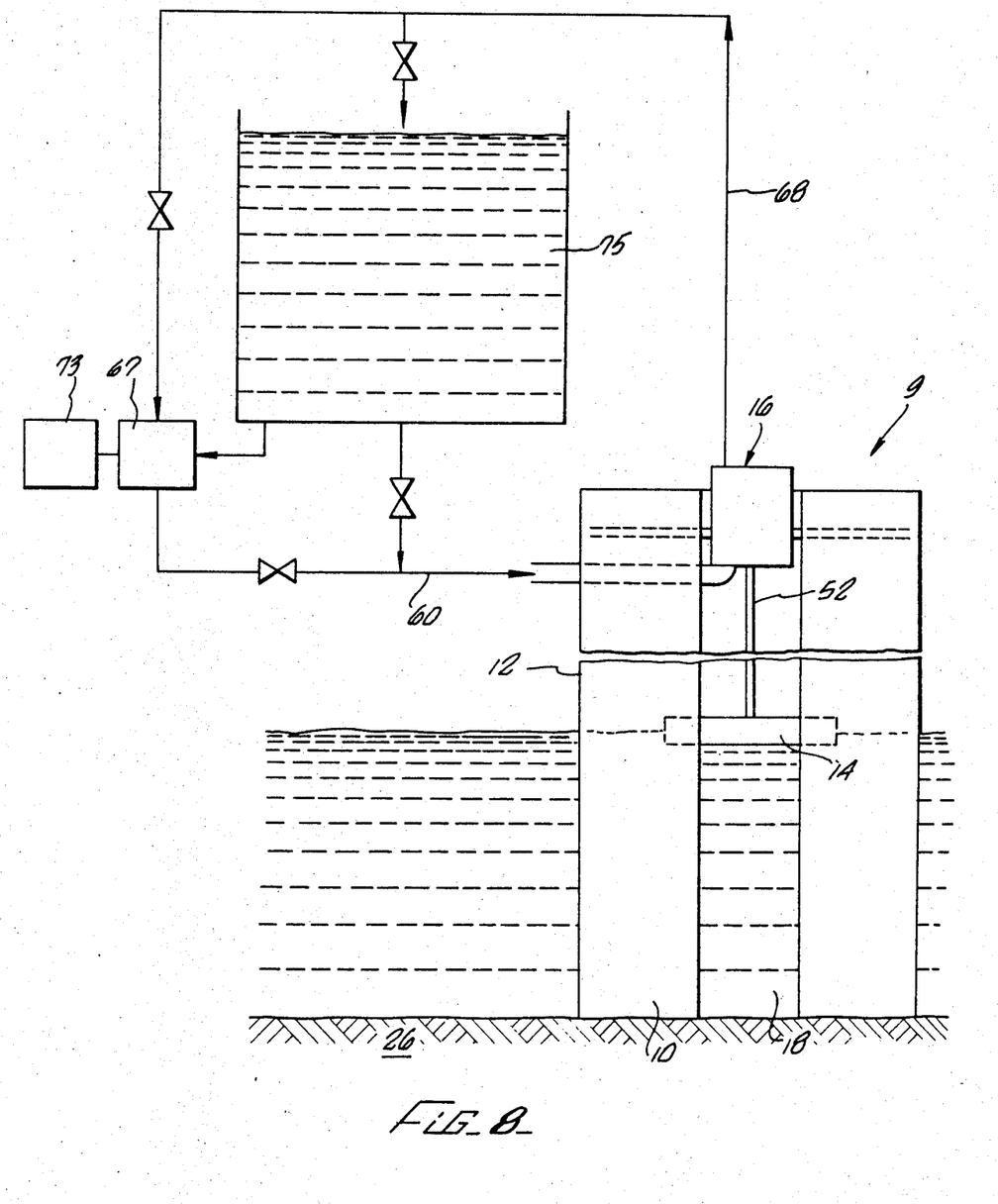
FIG. 8 schematically shows a system for generating electricity using a resonant chamber and float.

In the version shown in FIGS. 1, 2 and 8, the pump 16 is a piston pump having a piston 41 reciprocatingly moving up and down in a cylinder 43. The pump pumps water both on the upstroke and downstroke, with the region above the piston 41 being provided with an inlet valve 44 and an outlet valve 46 and the region below the piston 41 also being provided with an inlet valve 48 and an outlet valve 50. All four of the valves 44, 46, 48 and 50 are one way valves such as check valves.

A vertical piston rod 52 connects the float 14 to the piston 41. As the float 14 moves from the top of a wave to the trough between two waves, the piston 41 is pulled downwardly by the rod 52. This forces hydraulic fluid out of the lower outlet valve 50 and brings hydraulic fluid into the cylinder 42 through the upper inlet valve 44. Then, as the float 14 moves from the trough to the peak of a wave, the piston 41 is pushed upwardly. This pumps hydraulic fluid out of the cylinder 43 through the upper outlet valve 46 and brings water into the cylinder through the lower inlet valve 48.

Hydraulic fluid is passed into the cylinder 42 through an inlet conduit 60 having an upper branch 62 connected to the upper inlet valve 44 and a lower branch 64 connected to the lower inlet valve 48. The pumped fluid is pumped to power generating means such as a hydraulic motor 67 through an outlet conduit 68 having an upper branch 70 connected to the upper outlet valve 46 and a lower branch 72 connected to the lower outlet valve 50. The motor 67 can be used to operate a generator 73. If desired, a reservoir 75 can be provided for storing pumped hydraulic fluid for use when wave conditions are inadequate or when repairing equipment.

The hydraulic fluid is a liquid and can be water such as ocean water and fresh water, or can be oil. The hydraulic system can be at low pressure or at high pressure.

Figure 20:
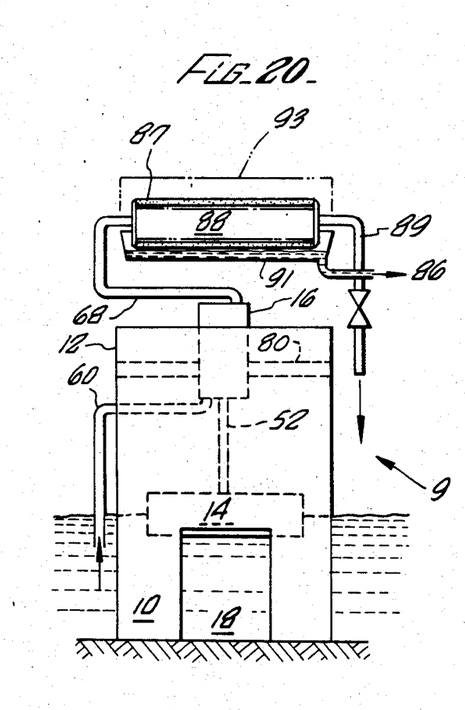
FIG. 20 schematically shows the present invention in a reverse osmosis water purification system.

The present invention also provides hydraulic power for direct application in water supply systems and the like. Fresh water from a reservoir can be directed to the inlet conduit 60 and pumped by the pump 16 through the outlet conduit 68. Moreover, as shown in FIG. 20 and further described below, the pump 16 can be connected in a system for converting salt water to fresh water, such as a system employing reverse osmosis, providing hydraulic pressure for the conversion process.

Preferably the float is positioned in the chamber so that it is centrally located in the chamber, or is closer to the back wall of the chamber than it is to the opening. These positions are more effective in taking advantage of the amplification of the chamber 10 than is a position that is close to the opening 18.

An advantage of the use of a resonant chamber 10 is that the walls 12 of the chamber can be used to structurally support the equipment used for converting the kinetic energy of the float 14 into useful energy. For example, as shown in FIGS. 1 and 2, the pump 16 is supported by a plurality of girders 80 extending radially inwardly from the inside of the wall 12 of the chamber 10.

Figure 6:
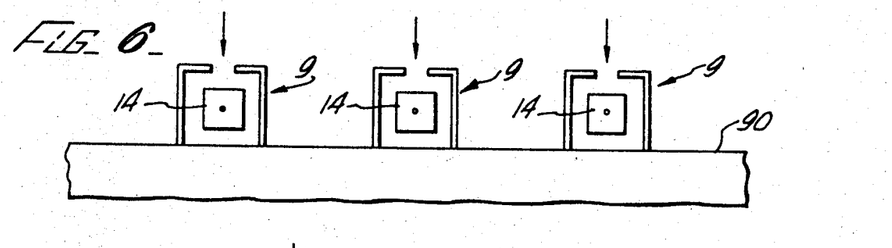
FIG. 6 is a top plan view of a breakwater forming the back wall of three resonant chambers according to the present invention.
Figure 7:
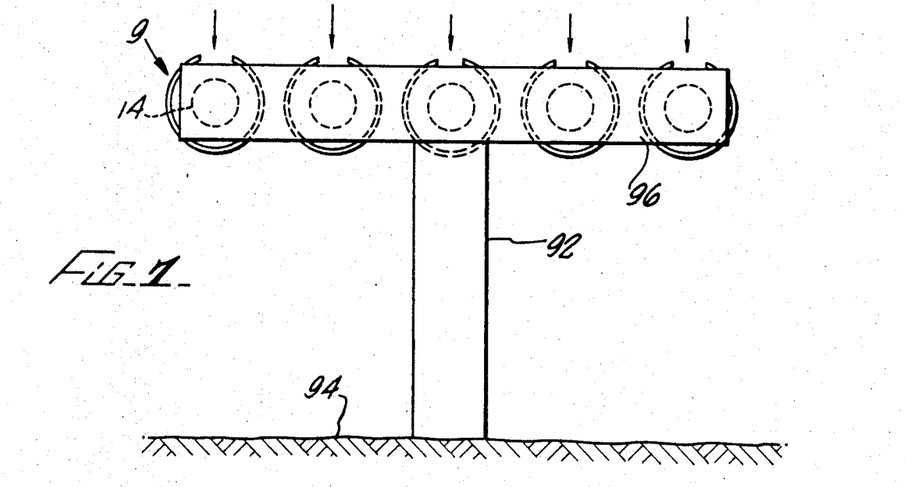
FIG. 7 shows five chambers according to the present invention positioned at the end of a pier.

As shown in FIGS. 6 and 7, a plurality of wave generating device 9 can be used together. In the version shown in FIG. 6, there are three devices 9 where the back wall of each device is provided by a breakwater 90. The breakwater can be an existing breakwater 90, or it can be prepared especially for the wave powered generating equipment. Thus, not only do the wave generating devices 9 produce useful energy, the system as a whole helps protect shore line structures.

In the version shown in FIG. 7, the devices 9 are positioned at the end of a pier 92 extending perpendicular to a shore line 94. The devices 9 are in a line parallel to the shore line and include a walkway 96 on top of them. This walkway 96 serves as an additional pier. The system in FIG. 7 not only generates energy from the ocean waves, but provides enhanced recreational and boating opportunities.

It has been discovered that the design of the opening 18 significantly influences the performance of the apparatus 9, especially at large wave amplitudes. In particular, a smooth entrance contour for the opening 18 is desirable for reducing the energy losses associated with the turbulence generated by movement of the water through the opening. These energy losses are related to the velocity of the flow through the entrance.

Figure 9:
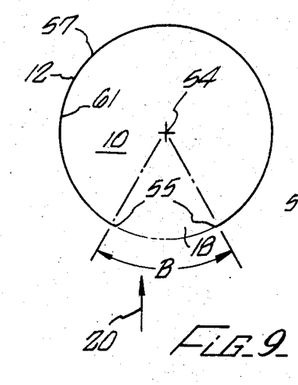
FIG. 9 schematically shows a top plan view of a circular wave amplification chamber according to the present invention.

A simple configuration of the chamber 10 is shown in FIG. 9, the wall 12 being a circular cylinder. The opening 18 subtends an angle B of 60° about a central axis 54 of the chamber 10 between opposite edges 55 of the wall 12.

Figure 10:
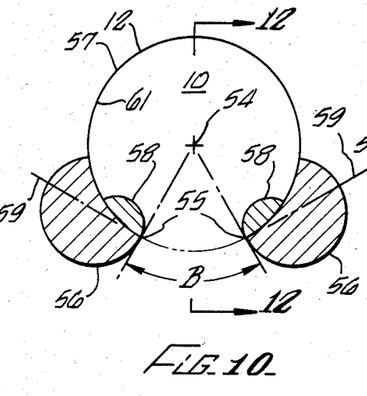
FIG. 10 schematically shows another version of the chamber of FIG. 9.

In an improved version of the chamber 10, shown in FIG. 10, a pair of external cylindrical members 56 is added to an outside surface 57 of the wall 12, and a pair of internal cylindrical members 58 is added to an inside surface 61 of wall 12 on opposite sides of the opening 18 for providing convex appurtenances proximate to the opening 18, providing a smooth contour for the flow of water through the opening.

The term "cylindrical" as applied to the cylindrical members 56 and 58 is defined herein as having a cross-section taken perpendicular to the edge 55 that is uniform or smoothly changes as the position of the cross-section is moved along the edge 55. The cylindrical members 56 and 58 can be straight or curved, because the edges 55 can be straight or curved. A cross-section of the cylindrical members 56 and 58 taken perpendicular to the edge 55 is uniform along at least a portion of the edge 55. Thus the cylindrical members 56 and 58 are oriented generally parallel to the edge 55.

The cylindrical members 56 and 58 are circular cylindrical members in FIG. 10, i.e. a cross-section thereof taken perpendicular to the edge 55 includes at least a segment of a circle. This is done for ease of manufacture. The external cylindrical member 56 is larger than the internal cylindrical member 58 because the area available for the internal cylindrical member 58 is restricted within the chamber 10. A smooth transition is provided at the edge 55 by locating the cylindrical members 56 and 58 on a common centerline 59, the centerline 59 being tangent to the wall 12 at the edge 55, and the cylindrical members 56 and 58 join each other along a line of tangency proximate to the edge 55.

The cylindrical members 56 & 58 should be generously sized relative to the size of the chamber 10 for effective smoothing of the flow of water. An equivalent diameter, E, of the cylindrical members 56 and 58 defined as $$E = (8C/pi)^{\frac{1}{2}}$$

where C is the cross-sectional area of the respective cylindrical member. The equivalent diameters of the cylindrical members 56 and 58 are at least about 1/10 the equivalent diameter, A, of the chamber 10.

Preferably the equivalent diameter of the external cylindrical member 56 is between 0.2A and 0.8A. Preferably the equivalent diameter of the internal cylindrical member, is not more than about 0.4A.

Figure 11:
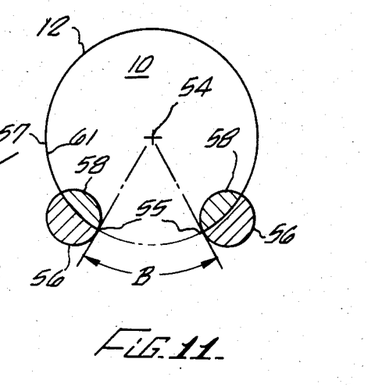
FIG. 11 schematically shows a sectional plan view of a further version of the chamber of FIG. 9.

Alternatively, the internal and external cylindrical members 56 and 58 are single circular cylindrical members as shown in FIG. 11 for ease of manufacture.

Figure 12:
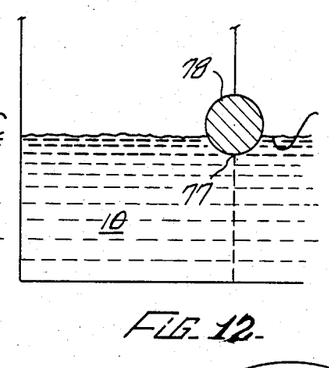
FIG. 12 schematically shows a sectional elevational view of a modified version of the chamber of FIG. 10 taken along line 12—12 in FIG. 10.

With reference to FIGS. 12–14, and 19, the external cylindrical member 56 and the internal cylindrical member 58 can extend along a top edge 77 of the opening 18 in the form of a cylindrical beam-shaped member 78. As shown in FIG. 12, the beam-shaped member 78 is circular in cross-section, the bottom of the beam-shaped member 78 extending below the plane 22 of the water.

Figure 13:
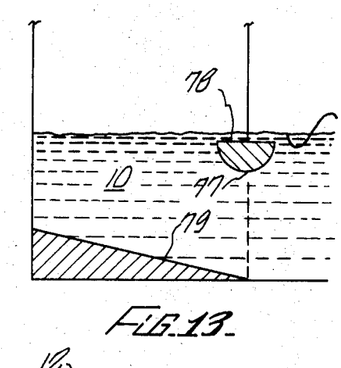
FIG. 13 schematically shows a sectional elevational view of another version of the chamber of FIG. 12.

As shown in FIG. 13, a ramp member 79 is included in an alternate configuration of the chamber 10, the ramp member 79 resting on the sea bed 26 for directing water entering the opening 18 upwardly toward the wall 12 opposite the opening 18 for increasing the amplitude of the waves in the chamber 10. Additionally, the beam-shaped member 78 includes only a lower semicircular portion of the circular cross-section of the version of FIG. 12.

Figure 19:
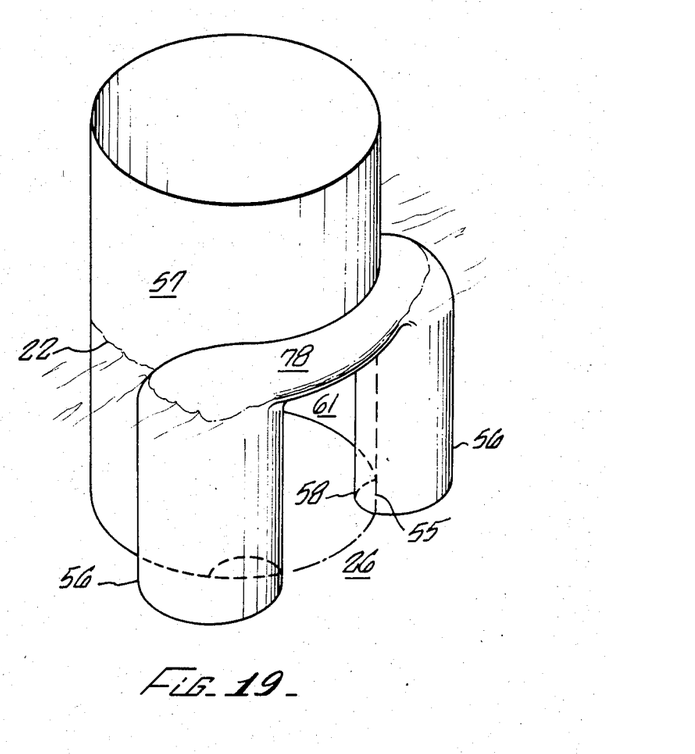
FIG. 19 schematically shows oblique elevational perspective view of the wave amplification chamber of FIG. 12.

As shown in FIG. 19, the beam-shaped member 78 blends into vertical portions of the cylindrical members 56 and 58, the members 56 and 58 extending upwardly from the sea bed 26 to a point beyond the top of the opening 18.

Figure 14:
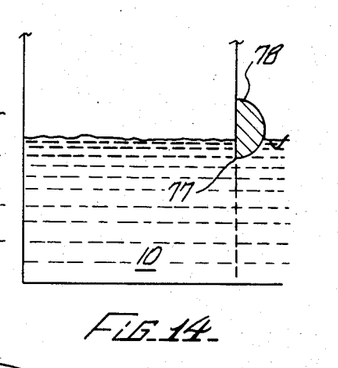
FIG. 14 schematically shows a sectional elevational view of a further version of the chamber of FIG. 12.

Alternatively the beam-shaped member 78 has a semicircular cross-section that projects only outwardly from the outside surface 57 as shown in FIG. 14.

Figure 15:
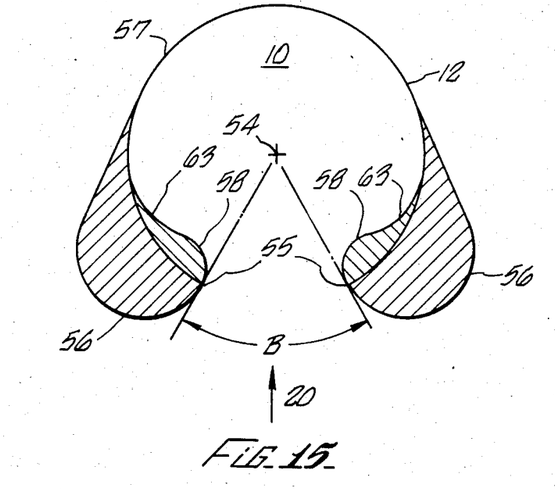
FIG. 15 schematically shows a top plan view of another version of the chamber of FIG. 10.

As shown in FIG. 15, the cylindrical members 56 and 58 blend into the wall 12 in a modified version of the chamber 10, advantageously avoiding sharp corners at the intersections of the cylindrical members 56 and 58 with the wall 12 away from the edge 55 of the opening 18. The external cylindrical member 56 extends tangent to the outside surface 57 of the wall 12 for reducing side loading of the apparatus 9 and structurally strengthening the apparatus 9 against the wave motion. The internal cylindrical member 58 has a concave portion 63 blending with the inside surface 61 of the wall 12 for further strengthening the apparatus 9 and for smoothing the flow of the water within the chamber 10, reducing energy losses associated with turbulence of the water within the chamber.

Figure 16:
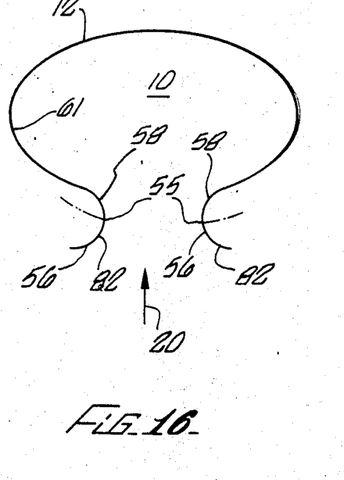
FIG. 16 schematically shows a top plan view of an ellipitical wave amplification chamber according to the present invention.

As shown in FIG. 16, another version of the present invention has an elliptical chamber 10. The inside surface 61 of the wall 12 is continuously concave, except that portion proximate to the opening 18. A smooth contour for the opening 18 is provided by a pair of opening members 82 at opposite sides of the opening 18, the opening members being convex toward the opening 18. Considering the edges 55 of the wall 12 to be located at the closest facing points on the opening members 82 opposite the opening 18, the opening members 82 function as the cylindrical members 56 and 58, smoothing the flow of water both into and out of the chamber 10.

Figures 17, 18:
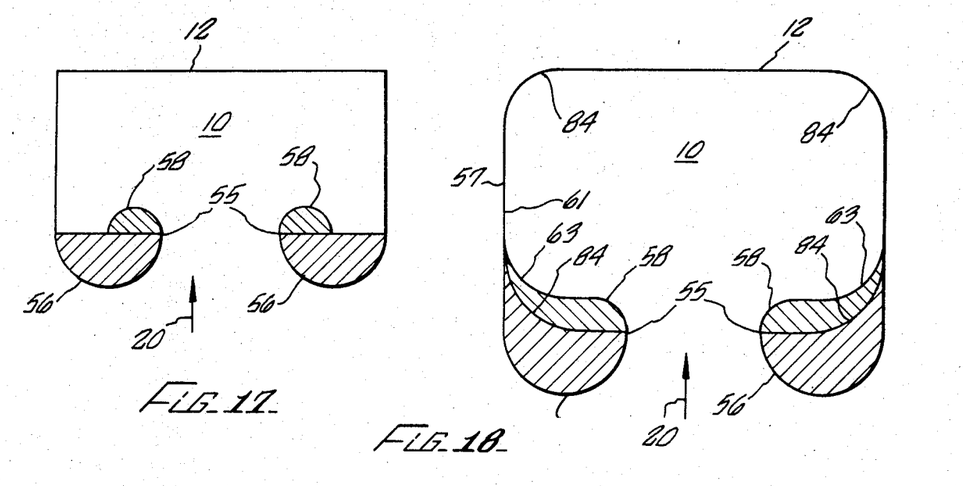
FIG. 17 schematically shows a top plan view of a rectangular wave amplification chamber according to the present invention.
FIG. 18 schematically shows a top plan view of another version of the chamber of FIG. 17.

With reference to FIGS. 17 and 18, the cylindrical members 56 and 58 are incorporated in a rectangular version of the chamber 10. The version of FIG. 18 includes rounded corner portions 84 of the wall 12 for structurally strengthening the apparatus 9 and for smoothing the inside surface 61 of the wall 12, reducing turbulence as described above.

With reference to FIG. 20, the apparatus 9 in another version of the present invention converts the wave motion directly into useful hydraulic power. The inlet conduit 60 is connected directly to a source of water, such as the body of water powering the chamber 10. The outlet conduit 68 is connected to a water supply system 86 as further described below.

The apparatus 9 provides a water purification system based on reverse osmosis. The water entering the inlet conduit 60 can be brackish water or any water containing dissolved impurities such as sea water. The outlet conduit 68 feeds a porous cylindrical support member 87, the support member 87 being lined with a suitable membrane 88. The support member 87 is connected to a return conduit 89 for exhausting contaminated water, the return conduit 89 having a pressure control valve 91 therein for maintaining sufficient pressure in the support member 87 to overcome the osmotic pressure associated with the combination of the source water and the membrane. A collector 91 receives water passing through the membrane 88 and the support member 87, passing the water to the water supply system 86. The collector 91 can include a pressure vessel 93 for imparting positive pressure from the pump 16 to the water supply system 86.

The power converter system of the present invention has significant advantages. Because of the appurtenances providing a smooth contour for the opening 18 of the chamber 10, increased energy output from the float and pump are possible. Moreover, the chamber walls 12 protect the float and other structures from the action of the ocean. Also, the structure is very simple, not requiring articulated arms and other fragile, complex structures for converting the up and down motion of the float 14 to useful energy.

EXAMPLE 1

A test was conducted on a 1:40 scale. The chamber 10 was configured as in FIG. 9, the wall 12 thereof forming a circular cylinder having a 1½ foot diameter, an opening 18 subtending an angle B of 60°, and was placed in water 1 foot deep. The incoming waves had a period of from one second to three seconds. The float was cylindrical, having a diameter of 9.6 inches and a thickness of 3/2 inch. It was made of plywood, lead and Styrofoam ™ and was half submerged. This scaled test corresponded to a chamber having a 60 foot diameter with a 60 degree opening placed in 40 feet deep water with a wave period of 6 seconds to 18 seconds, and a float diameter of 32 feet, the float being 5 feet thick.

The amplification factor achieved in the unloaded condition was from 2 to 3.5. In other words, the amplitude of the motion of the float was from 2 to 3.5 times greater than the amplitude of the waves entering the chamber. The chamber operated in the fundamental resonance mode.

EXAMPLE 2

Further tests, without the float, were performed for determining the effects of the cylindrical members 56 and 58 and the beam-shaped member 78 as shown in FIGS. 10–14.

The radius of the outside cylindrical member 56 was 4.5 inches and 2.25 inches, respectively, in the versions of FIGS. 10 and 11. The radius of the inside cylindrical member 58 was ¼ the radius of the chamber 10. The version of FIG. 10 was also tested without the internal cylindrical members 56. In the version of FIG. 13, the ramp member 79 extended vertically 4 inches above the bottom of the chamber 10 and the bottom of the beam-shaped member 78 was 9 inches above the bottom of the chamber 10. In the versions of FIGS. 12 and 14, the bottom of the beam-shaped member 78 was 10.5 inches above the bottom of the chamber 10. The cross-sectional radius of the beam-shaped member 78 was 2 inches.

Of the configurations tested, the greatest increase in the amplitude of the waves was with the combination of the external cylindrical members 56 and the internal cylindrical members 58 of FIG. 10 with the circular beam-shaped member 78 of FIG. 12. The amplitude of the wave motion in the chamber 10 was from 3 to more than 4 times greater than the amplitude of the waves approaching the chamber. Thus the smooth contours of the opening 18 provided by the present invention provide a significant increase in the wave amplification over that attained in the version of FIG. 9.

Although the present invention has been described in considerable detail with reference to certain preferred versions thereof, other versions are possible. For example, the chamber in some situations may not be resonant, depending upon the character and spacing of the ocean waves. However, even in such a configuration, the chamber serves to protect the float and other equipment from the action of the ocean waves. Therefore, the spirit and scope of the appended claims should not necessarily be limited to the description of the preferred versions contained herein.

What is claimed is:

1. An apparatus for amplifying the wave motion of a large body of water, the aparatus comprising:
   (a) a chamber in the body of water, the chamber having a wall including a substantially vertical wall portion substantially perpendicular to the plane of the water with an opening therethrough, the wall having an outside surface and an inside surface, the opening generally facing the direction of wave propagation for passage of water into and out of the chamber, the chamber amplifying the wave motion of the body of water so that the amplitude of waves in the chamber is greater than the amplitude of the waves passing into the chamber; and
   (b) a convex appurtenance attached to the wall proximate to the opening for smoothing the flow of water through the opening, the convex appurtenance having an equivalent cross-sectional diameter of at least 1/10 the equivalent cross-sectional diameter of the chamber.

2. The apparatus of claim 1 wherein the appurtenance comprises an external cylindrical member attached to the outside surface of the wall.

3. The apparatus of claim 1 wherein the appurtenance includes an internal cylindrical member attached to the inside surface of the wall.

4. The apparatus of claim 1 wherein the opening terminates below the top of the wall and the appurtenance includes a horizontal cylindrical member, the horizontal cylindrical member extending across the top of the opening.

5. The apparatus of claim 4 wherein the bottom of the horizontal cylindrical member is located below the plane of the water.

6. The apparatus of claim 4 wherein the horizontal cylindrical member is circularly cylindrical.

7. The apparatus ot claim 2 wherein the external cylindrical member has an equivalent cross-sectional diameter of from 0.2 to 0.8 times the equivalent cross-sectional diameter of the cylinder.

8. The apparatus of claim 3 wherein the internal cylindrical member has an equivalent cross-sectional diameter of from 0.1 to 0.4 times the equivalent cross-sectional diameter of the cylinder.

9. The apparatus of claim 1 wherein the appurtenance includes an external cylindrical member external to the chamber and an internal cylindrical member extending into the chamber, the external cylindrical member smoothly joining the internal cylindrical column along a line of tangency.

10. The apparatus of claim 9 wherein the external and internal cylindrical members comprise circular sections, the external cylindrical member having a radius approximately double the radius of the internal cylindrical member.

11. An apparatus for converting power from the wave motion of a large body of water, the apparatus comprising:
    (a) a resonant chamber in the body of water, the chamber having an exterior wall including a vertical wall portion having an opening therein, the opening facing the wave motion, the chamber being sized so that the equivalent diameter of the chamber is from $0.15L/pi$ to $L/pi$ where $L$ is the length between the crest of waves, the chamber amplifying the wave motion of the body of water in the fundamental mode so that the amplitude of waves in the chamber is greater than the amplitude of the waves moving against the vertical wall portions;
    (b) a float in the chamber, the float moving up and down in response to the wave motion in the chamber;
    (c) pump means operatively connected to the float for converting the kinetic energy of the float to useful energy; and
    (d) a convex appurtenance attached to the exterior wall proximate to the opening for smoothing the flow of water through the opening.

12. The apparatus of claim 11, wherein the pump means is connected to a source of brackish water, including means for purifying the water by reverse osmosis.

13. An apparatus for amplifying the wave motion of a large body of water, the apparatus comprising:
    (a) a chamber in the body of water, the chamber having a wall with an opening therethrough, the wall having an outside surface and an inside surface, the opening generally facing the direction of wave propagation for passage of water into and out of the chamber; and
    (b) a convex appurtenance proximate to the opening for smoothing the flow of water through the opening.

14. The apparatus of claim 13 wherein the convex appurtenance is attached to the wall.

15. The apparatus of claim 13 wherein the wall includes a substantially vertical wall portion substantially perpendicular to the plane of the water.

16. The apparatus of claim 13 wherein the convex appurtenance has an equivalent cross-sectional diameter of at least 1/10 the equivalent cross-sectional diameter of the chamber.

* * * * *